Jan. 18, 1966   J. S. FREISMUTH ETAL   3,229,909
THERMOSTATIC VALVE
Filed July 5, 1963
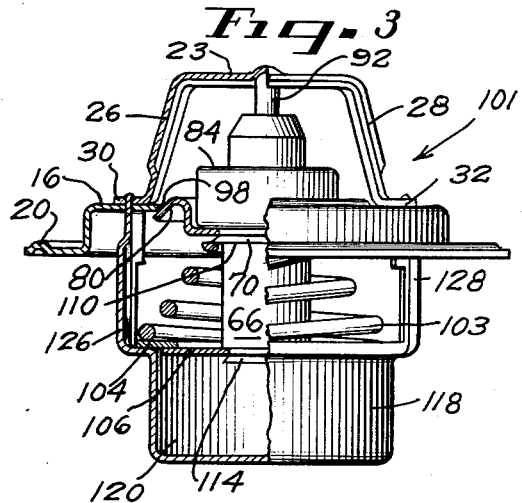
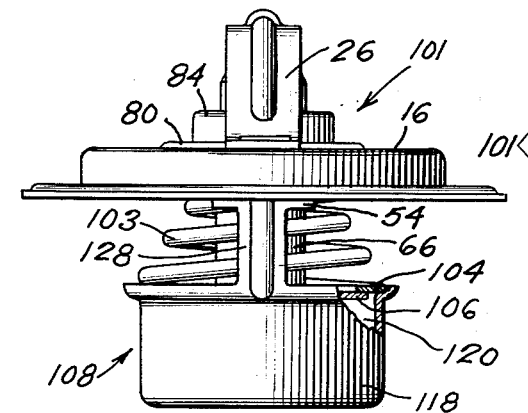
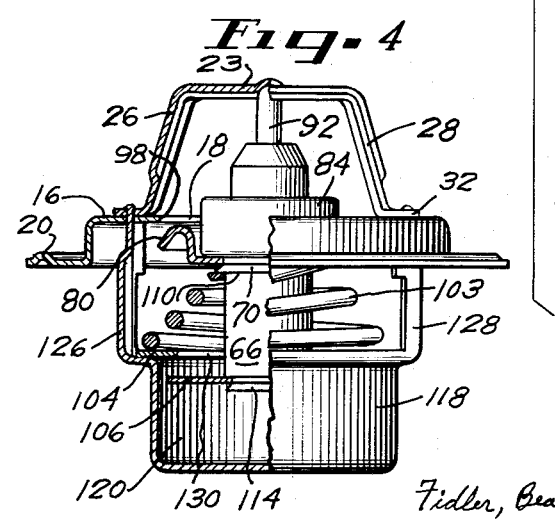
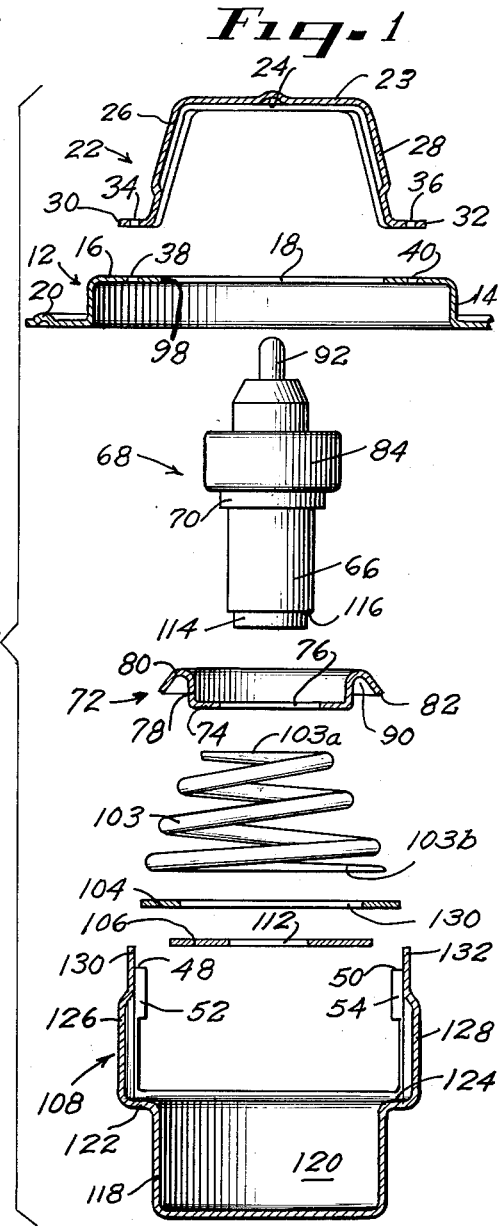
INVENTOR.
John S. Freismuth
BY Steven J. Jancovic
Fidler, Beardsley, Bradley, Patnaude & Petherbridge
ATTORNEYS

United States Patent Office 3,229,909
Patented Jan. 18, 1966

3,229,909
THERMOSTATIC VALVE
John S. Freismuth and Steven J. Jancovic, Arlington Heights, Ill., assignors to Sterling Automotive Manufacturing Company, Elk Grove Village, Ill., a corporation of Illinois
Filed July 5, 1963, Ser. No. 292,982
7 Claims. (Cl. 236—34)

This invention relates to pressure insensitive and thermostatically operated valves and is more particularly directed to such thermostatic valve assemblies employed to control the coolant temperature of cooling systems of internal combustion engines or the like.

The thermostat valves constructed in accordance with the principles of the present invention are of the type employing a temperature responsive thermal sensitive element, such as the type of thermal element described in Vernet Patent No. 2,259,846.

Heretofore, difficulty has been encountered in the design and manufacture of such thermostat valve assemblies for controlling the coolant temperature of an internal combustion engine or the like. For example, many prior attempts have been made to provide a valve head and valve seat arrangement for the thermostatic valve assembly which will provide an effective positive seal between the valve head and valve seat without requiring costly and time consuming machining of the valve head or valve seat. Such a positive seal is necessary to prevent leakage between the valve head and the valve seat which, for example, may occur as a result of sporadic pressure differentials across the head caused by variations in pump pressure in the coolant flow system.

It has also been attempted in the prior art to eliminate the effects of such pump pressure on the sealing arrangement of the valve head and valve seat. Prior attempts have resulted in many complicated valve head and valve seat arrangements which are costly to produce and which are not totally efficient in operation.

With the present invention, the aforementioned problems and difficulties of the prior art, among others, are substantially overcome by the provision of a pressure insensitive thermostatic valve assembly of simple and compact construction, having a new and improved valve head and valve seat arrangement, and which includes sub-assemblies which may be used interchangeably in both a non-pressure balanced thermostat assembly and in a pressure balanced thermostat assembly as indicated hereinafter.

It is, therefore, an object of the present invention to provide new and improved pressure insensitive thermostat valve assemblies.

Another object of the present invention is to provide new and improved pressure insensitive thermostat valve assemblies having a new and improved valve head and valve seat arrangement providing thereby an effective positive seal therebetween.

Still another object of the present invention is to provide such a thermostatic valve assembly including parts which may be used interchangeably in both a non-pressure balanced reverse poppet-type thermostatic valve and in a pressure-balanced thermostatic valve.

A still further object of the present invention is to provide a pressure-balanced reverse poppet-type thermostatic valve assembly.

These and other objects, features and advantages of the present invention will become readily apparent to those versed in the art, from a careful consideration of the following detailed description, when considered in conjunction with the accompanying drawing, illustrating preferred embodiments of the present invention, wherein like reference numerals and characters refer to like and corresponding parts throughout the several views, and wherein:

FIGURE 1 is an exploded view in partial section of a pressure-balanced thermostatic valve constructed in accordance with the present invention.

FIG. 2 is a view in elevation of the thermostatic valve assembly of FIG. 1, after assembly thereof, and partially broken to facilitate illustration;

FIG. 3 is a side view in partial section of the thermostatic valve assembly of FIG. 2, illustrating the valves of the assembly in closed positions; and FIG. 4 is a view similar to FIG. 3 illustrating the valves of the thermostatic valve assembly of FIG. 2 in open positions.

Although the present invention has a variety of applications, a suitable application therefor is that of controlling the coolant temperature of an internal combustion engine.

The thermostatic valve assembly constructed in accordance with the principles of the present invention includes four sub-assemblies which may be used interchangeably in the manufacture of both a non-pressure balanced thermostatic valve assembly and in a pressure-balanced thermostatic valve assembly. Thus, the cost of manufacture of these two types of thermostatic valve assemblies employing these common parts may be considerably reduced. In addition, the costs of the manufacturer and supplier of the valve assemblies are further reduced, since the number of parts needed to be stocked in storage is also reduced.

A preferred embodiment of a pressure balanced reverse poppet-type thermostatic valve assembly constructed in accordance with the present invention and which incorporates four sub-assemblies common to a non-pressure-balanced type thermostatic valve assembly will first be described, with reference being made to FIGS. 1–4.

Referring to FIGS. 1–4 and particularly to FIG. 1, there is shown in FIG. 1 an exploded view in vertical section of a thermostatic valve assembly constructed in accordance with the present invention and generally indicated by the numeral 101.

The assembly 101 includes an annular member 12 which has an inverted cup-shaped body portion 14 having a circular, flat upper wall 16 formed with a central circular opening 18 defining a fluid flow port. The body portion 14 has an external annular flange 20 for mounting the assembly 101 between the engine of an automobile and the water outlet elbow of the coolant flow system. This mounting position is a location at which thermostatic valve assemblies are generally positioned. The thermostatic valve assembly 101 controls the flow of coolant through the engine, radiator or heat exchanger (not shown).

An upper inverted channel-shaped strap 22 having a body portion 23 with a central recess 24 and two legs 26 and 28 with out-turned end flanges 30 and 32, respectively, is provided which is sized to seat on the upper surface of the wall 16.

It will be observed that each of the end flanges 30 and 32 is apertured, as indicated at 34 and 36. The upper wall 16 of the member 12 is complementarily apertured, as indicated at 38 and 40. The apertures 34, 36, 38 and 40 are provided to receive the stake ends 130 and 132 of a lower bracket 108. The stakes 130 and 132 are passed through the apertures 34, 36, 38 and 40, when these apertures are aligned, until the lower surface of the wall 16 is engaged by abutment shoulders 48 and 50 provided by radial projections 52 and 54 carried by the bracket 108. The stakes 130 and 132 terminate above the upper surface of the end flanges 30 and 32 of the upper strap 22 when the shoulders 48 and 50 engage the wall 16 of the mounting flange member 12. The ends of the stakes 130 and 132 may be bent over onto the upper surface of the end flanges 30 and 32 of the strap 22 or otherwise expanded to secure the bracket 108, strap 22 and member 16 in assembled relation. Thus, simple and effective means are provided for securing the lower bracket, upper strap and mounting flange member in assembled relation.

As used herein the term "thermal element" is intended to mean "thermal sensitive element." The body portion 66 of the thermal element 68 includes a collar 70 which may be swaged, as shown in FIG. 3, to secure a valve member 72 to the thermal element.

The valve member 72 comprises a circular and flat base 74 centrally apertured, as indicated at 76, an annular circular sleeve body portion 78 and an outwardly extending and downwardly turned arcuate annular end flange 80. The end flange 80 provides an outer tapered valve head for purposes more fully discussed hereinafter. The outer end 82 of the end flange 80 is located in spaced relation to the body portion 78.

To assemble the valve member 72 to the thermal element 68, the body portion 66 of the thermal element 68 is inserted vertically into the aperture 76 of the valve member 72, until a portion of the collar 70 of the thermal element extends below the lower surface of the base 74 of the valve member 72. To properly seat the collar 70 in this position, the annular plunger guide portion 84 of the thermal element 68 is employed as a stop or abutment surface for engagement with the upper surface of the base 74 of the valve member 72. The collar 70 is then swaged, as shown in FIG. 3, to fixedly secure the valve member 72 to the thermal element 68.

It will be appreciated that a feature of the present invention resides in the tapering of the valve head flange 80 of the valve member 72 so that machining of the valve head employed in the thermostatic valve assembly may be eliminated as well as fine machining of the valve seat 98.

Referring to FIG. 1, in addition to the strap 22, mounting flange member 12, thermal element 68, and the valve member 72 which is swaged to the thermal element 68, as clearly appears in FIGS. 3 and 4, the pressure-balanced thermostatic valve assembly 101 of FIG. 1 includes a compression spring 103, a valve seat ring 104, a second valve member 106 and a cup-shaped lower bracket member 108.

The spring 103 shown in FIG. 1 includes helices which increase in diameter from the upper end 103a to the lower end 103b of the spring. This construction of spring 103 is provided so that the upper end 103a of the spring 103 may seat against the shoulder 110 (FIG. 8) provided by the swaged collar 70 of the thermal element and may seat at its opposite end against the upper surface of the flat valve seat ring 104 (FIGS. 3 and 4). The lower valve plate 106 is apertured, as indicated by the numeral 112 and is a flat cylindrical ring. The valve plate 106 is swaged or otherwise secured to a bottom projection 114 located at the bottom of the body portion 66 of the thermal element 68, as clearly appears in FIGS. 3 and 4. Thus, thermal element 68 carries the upper valve member 72 secured to the collar 70 and the lower valve plate 106 secured to the collar or projection 114. To assemble the thermal element 68 and the valve 106, the collar 114 of the thermal element is inserted in the aperture 112 of the plate 106 and the upper surface of the plate 106 abuts the shoulder 116 of the thermal element. The lower end of the collar 114 is swaged to secure the plate 106 to the thermal element 68.

The cup-shaped lower bracket 108 includes a lower cup-shaped section 118 defining a chamber 120 and is provided with an annular outwardly extending flange 122. The upper surface 124 of the flange 122 provides a seat for the valve seat ring 104 as shown in FIG. 4.

Extending upwardly and in parallel relation from the flange 122 of the member 108 are a pair of opposite legs 126 and 128. A stake 130 is provided on the end of the leg 126 and a similar stake 132 is provided on the outer end of the leg 128. These stakes 130 and 132 are provided to pass through the apertures 34, 36, 38 and 40 with the ends thereof turned to secure the strap 22 and flange member 12 to the bracket 108. The legs 126 and 128 are, as aforesaid, provided with projections 52 and 54 having stop surfaces 48 and 50.

In assembling the thermostatic valve assembly 101, the valve member 72 is secured to the thermal element 68. The spring end 103 is bottomed against the shoulder 110 provided by the collar 70 and the body 66 of the thermal element is passed through the space defined by the helices of the spring 103. The lower collar 114 of the thermal element 68 is passed through the aperture 130 of the valve seat 104 and the spring end 103b is bottomed on the valve seat ring 104. The lower valve ring 106 is positioned below the valve seat ring 104 and the collar 114 of the thermal element inserted in the aperture 112 of the valve ring 106. The valve ring 106 is then secured to the thermal element 68 by swaging the lower end of the collar 114. In assembling the thermal element and valve plate 106, the spring 103 is placed under a light compression.

Next the parts thus assembled are inserted between the legs 126 and 128 of the cup-shaped bracket 108 until the lower surface of the valve seat ring 104 engages the shoulder 124 provided by the surface of the flange 122 as appears in FIGS. 3 and 4.

The parts assembled in this manner are then placed in in a spring compression device (not shown) which will fixedly hold these parts so that the upper strap 22 and mounting flange member 12 may be secured to the bracket 108 to complete assembly of the thermostatic valve assembly 101.

The strap 22 and mounting flange member 12 are positioned so that the apertures 34, 36, 38 and 40 are aligned with the stakes 130 and 132 of the bracket 108. The stakes 130 and 132 are passed through the apertures 34, 36, 38 and 40 and the upper end of the stakes are bent over to secure the strap 22, mounting flange member 12 and bracket 108. In securing the stakes 130 and 132, the spring 103 is compressed and the valve member 106 located below the valve seat 104 engages the lower surface of the valve seat, and the valve head flange 80 of the upper valve member 72 engages the edge valve seat 98 of the member 12. The spring 103, acting against the valve seat 104, holds it to the shoulder 124 and, acting against the thermal element, holds the valve 106 against the valve seat 104 in addition to holding the valve head flange 80 against the valve seat 98 of the member 12 as appears in FIG. 3. The spring 103 also biases the plunger 92 of the thermal element in the recess 24 of the strap 22.

In operation, the assembly 101 is inserted in the coolant flow system of an internal combustion engine, The valve member 72, when seated, prevents coolant flow through the flow port 18.

In the valve closed position appearing in FIG. 3, the fluid coolant pump pressure acts on the lower surface of the valve member 72. This pump pressure, acting on the lower surface of the valve member 72, tends to counteract the force applied to the valve member 72 by the thermal element, during downward movement of the thermal element body portion 66, to open the port 18. This coolant fluid pump pressure thus tends to prevent the thermostatic valve assembly from operating efficiently by delaying opening of the port 18. By providing the lower valve member 106, the valve seal seat 104 and cup-shaped housing 118, the coolant fluid pump pressure acting on the upper surface of the valve 106 counterbalances this same pump pressure acting on the lower surface of the upper valve member 72, so that this pump pressure is prevented from delaying opening of the port 18. In the position shown in FIG. 3 wherein the port 18 is closed by the valve 72, leakage of fluid across the valve 106 from acting as a pressure balance member for constructed of rubber, and the sealed cup-shaped portion 118 of the bracket 108 prevents this pump pressure from acting on the lower surface of the valve ring 106. It will be appreciated that this pump pressure acting on the lower surface of the ring 106 would prevent the valve 106 from acting as a pressure balance member for the valve member 72.

In operation, with the valve member 72 seated against the edge 98 of the mounting flange member 12 to close the coolant flow port 18 and with the valve member 106 seated against the seal 104, the coolant flow pump pressure acting on the lower surface of the valve member 72 is counterbalanced by the coolant fluid pump pressure acting on the upper surface of the closed valve ring 106, the lower surface of the ring 106 being sealed from pump pressure in the chamber 120.

As the coolant temperature rises, the body portion 66 of the thermal element 68 is heated and the expansible material in the thermal element expands and acts against the plunger 92 and against the strap 22. The plunger forces the body portion 66 of the thermal element downwardly against the force of the compression spring 103. The helices of the spring tend to nest during such compression. During the downward movement of the body portion 66 of the thermal element, the valve member 72 is moved away from its seat 98 to permit coolant flow through port 18. Similarly, downward movement of the body portion 66 of the thermal element will move the valve ring 106 from its seat against the valve member 104, as appears in FIG. 4. In the position shown in FIG. 4, the sealing contact between the seal valve member 104 and the valve 106 is released so that any fluid entrapped in the chamber 120 is displaced by the downward movement of the valve 106.

Upon cooling of the body portion or housing 66 of the thermal element the expansible material contracts and the spring 103 expands to move the valve head flange 80 of the valve member 72 against its seat 98 and move the valve 106 against its seat on the ring 104 to thereby close the ports 18 and 130 as shown in FIG. 3.

Thus, it will be appreciated that in accordance with the present invention, a thermostatic valve assembly may be constructed having a minimum number of parts, positive sealing of the cooling flow port, and parts which are interchangeable for use in both a non-pressure balanced type thermostatic valve assembly and a pressure-balanced type thermostatic valve assembly by substituting a conventional lower strap for the bracket 108 and eliminating members 104 and 106. In addition, the present invention provides a new and improved pressure-balanced type thermostatic valve assembly.

Although various minor modifications and alterations of the present invention will become readily apparent from the foregoing description, it should be understood that what is intended to be encompassed within the scope of the patent warranted hereon are all such embodiments as reasonably and properly fall within the scope of the contribution to the art hereby made.

We claim:

1. A thermostat valve assembly including a mounting flange member having a central opening defining a fluid flow port, a strap carried by and extending across one surface of the mounting flange member with a raised portion thereof spanning said port in spaced relation thereto, a bracket secured to and extending across the opposite surface of the mounting flange member and carrying a cup-shaped housing defining a fluid chamber, legs carried by the bracket to space said cup-shaped housing from said mounting flange member, a temperature responsive thermal element extending through said port with a plunger thereof seated against said strap, a first valve member carried for movement by said thermal element, said valve member having an outer tapered valve head surface seatable against a first valve seat defined by the lower edge of the surface of the mounting flange member which defines said port, a balancing disc carried for movement by said thermal element in spaced relation to said first valve member and adjacent said chamber of said housing, means providing a second seat for said balancing disc to close said chamber, and a compression spring receiving a portion of said thermal element and bottomed at one end against said thermal element and at its opposite end against said bracket to urge said thermal element so that said plunger is seated on said strap and to urge said valve member and balancing disc against their respective seats to close said fluid flow port and said chamber substantially simultaneously, whereby fluid pressure forces acting on said balancing disc counter-balance the same fluid pressure forces acting on said first valve member, said first valve head surface seating against said first valve seat with portions of said valve head surface extending on both sides of said first valve seat to thereby provide a positive seal between said first valve head and said first valve seat.

2. The assembly of claim 1 wherein said housing is a cup-shaped housing including an annular radial seating flange, wherein said second seat comprises a centrally apertured ring seated on said radial seating flange of said housing, wherein the thermal element is movably disposed in the aperture of said second seat, and said balancing disc seats on the lower surface of said ring to close the aperture of the ring and thereby the chamber of said housing.

3. The assembly of claim 1 wherein the body portion of the thermal element has an annular external mounting collar for receiving said valve member, said collar holding said valve member to said thermal element.

4. The assembly of claim 3 wherein said thermal element carries a second collar defined by a projection, and said balancing disc is carried by said second collar.

5. The assembly of claim 3 wherein said one end of the spring is bottomed against a shoulder provided by said collar.

6. The asembly of claim 4 wherein said one end of the spring is bottomed on said first mentioned mounting collar.

7. A pressure insensitive thermostatic valve assembly including a mounting flange member having a central opening defining a fluid flow port, a strap carried by extending across one surface of the mounting flange member with a raised portion thereof spanning said port in spaced relation thereto, a bracket secured to and extending across the opposite surface of the mounting flange member with a portion thereof spanning said port, said bracket including a housing defining a chamber and carried in spaced relation to said port, a temperature responsive thermal element extending through said port with a plunger positioned adjacent said strap, first valve means carried for movement by said thermal element for closing said port, a balancing disc carried for movement by said thermal element for closing said bracket housing chamber substantially simultaneously with closing of said port, said first valve means and balancing disc defining a fluid flow passageway therebetween, said thermal element being partially disposed in said passageway, whereby fluid pressure in said passageway acting on said balancing disc, when said port and chamber are closed, counterbalances the action of said fluid pressure on said first valve means, and a compression spring bottomed at one end against said thermal element and at its opposite end against said bracket to urge said first valve means and balancing disc to their respective closed positions and to bias the plunger of said thermal element against said strap, whereby a rise in fluid temperature in said passageway to a predetermined temperature will cause movement of said first valve members and balancing disc to open said port and said chamber.

References Cited by the Examiner

UNITED STATES PATENTS

| | | | |
|---|---|---|---|
| 2,777,638 | 1/1957 | Wood | 236—34 |
| 2,842,317 | 7/1958 | Wood | 236—34 |
| 2,872,117 | 2/1959 | Puster | 236—34 |
| 2,895,677 | 7/1959 | Drapeau | 236—34 |
| 2,926,853 | 3/1960 | Wood | 236—34 |

FOREIGN PATENTS

| | | |
|---|---|---|
| 821,585 | 10/1959 | Great Britain. |
| 1,203,653 | 8/1959 | France. |

EDWARD J. MICHAEL, *Primary Examiner.*